United States Patent
Dithmer

[11] Patent Number: 5,855,857
[45] Date of Patent: Jan. 5, 1999

[54] METHOD AND APPARATUS FOR STERILIZATION AND/OR HEAT TREATMENT OF PRODUCTS IN PARTICLE FORM, E.G. BONE MEAL, AND PROCESSING PLANT HEREWITH

[75] Inventor: Lars Dithmer, Dragør, Denmark

[73] Assignee: Atlas-Stord Denmark A/S, Ballerup, Denmark

[21] Appl. No.: 844,860

[22] Filed: Apr. 23, 1997

[30] Foreign Application Priority Data

Apr. 23, 1996 [DK] Denmark ................................ 0481/96

[51] Int. Cl.⁶ ...................................................... B01F 9/16
[52] U.S. Cl. .............................. 422/307; 422/26; 422/32; 422/295; 422/298; 422/308; 432/134; 426/511; 426/521; 426/519; 366/341
[58] Field of Search ................................ 422/26, 32, 38, 422/33, 295, 298, 308, 307; 432/134; 426/511, 521, 465; 366/341, 9, 114, 109, 111, 112, 149

[56] References Cited

U.S. PATENT DOCUMENTS

| | | |
|---|---|---|
| 3,868,213 | 2/1975 | Shulika et al. ........................... 432/134 |
| 4,064,794 | 12/1977 | Kunz ............................................. 99/474 |
| 4,663,122 | 5/1987 | Sparks ......................................... 422/26 |
| 5,344,609 | 9/1994 | Long ........................................... 422/26 |
| 5,523,053 | 6/1996 | Dudek ........................................ 422/26 |

OTHER PUBLICATIONS

*Encyclopaedia of Food Science, Food Technology and Nutrition*(1993), "Sterilzation by Heat", pp. 4401–4402.

*Primary Examiner*—Krisanne Thornton
*Assistant Examiner*—Fariborz Moazzam
*Attorney, Agent, or Firm*—Antonelli, Terry, Stout & Kraus, LLP

[57] ABSTRACT

Apparatus (1) for sterilization and/or heat treatment of products in particle form, e.g. bone meal, and comprising an upright-standing pressure vessel (2) with elevator arrangement (6) which lifts the meal from the bottom area (5) to the top area (4), and lets it fall back to the bottom area for re-lifting.

The processing is effected by direct steam supply (16), whereby the meal is heated to sterilization temperature.

After the treatment or the sterilization, the vessel is emptied by the opening of a bottom valve (10). During the whole of the process, i.e. during filling, sterilization and emptying, the elevator arrangement (6) is in operation.

The elevator arrangement is, for example, a helical vibration elevator firmly built into the vessel and with external vibration motors (8), so that the whole of the vessel is made to vibrate.

14 Claims, 4 Drawing Sheets

5,855,857

METHOD AND APPARATUS FOR STERILIZATION AND/OR HEAT TREATMENT OF PRODUCTS IN PARTICLE FORM, E.G. BONE MEAL, AND PROCESSING PLANT HEREWITH

BACKGROUND OF THE INVENTION

1. Field of the Invention

The invention concerns a method, an apparatus and processing plant for the sterilization and/or heat treatment of products in particle form, e.g. bone meal, fish meal and other feedstuffs, possibly also foodstuffs.

2. Description of the Prior Art

It is known to sterilize bone meal and similar organic products in batches by heating the meal while it is stirred in a pressure vessel.

The known pressure vessels for this purpose are large, horizontally-lying vessels with a through-going, horizontal shaft which comprises mechanical stirring elements etc. The shaft is led out through the ends of the vessel via specially constructed stuffing-boxes and bearing arrangements. The heating is effected by the introduction of steam and possibly by heating of the shroud via a steam jacket. Such sterilization plants are characterized by high power consumption, great wear and tear, corrosion if the parts are not made of corrosion-free materials, almost constantly leaking stuffing-boxes, frequent bearing damage due to the leaking stuffing-boxes and due to the fact that it is difficult to seal the hatches necessary for the pressure vessel. The high energy consumption is due, among other things, to the fact that vessels of this kind as a rule cannot be filled more than 20% with meal which is to be sterilized, among other things because the stirring is not good enough if the vessel is filled more.

SUMMARY OF THE INVENTION

By sterilizing and/or heat treating in the manner as disclosed a number of advantages are achieved.

The apparatus can be constructed with an upright-standing pressure vessel, and therefore does not require as large a factory area (floor area) as the known types of apparatus and processes, which is a great advantage if, for example, an existing plant for the production of bone meal requires a heat treatment plant or a sterilization plant.

The consumption of energy is considerably less than with the known types of apparatus and processes.

The consumption of energy can be further reduced if the air is evacuated from the vessel before the heating steam is introduced.

The sterilization and/or heat treatment and cooling takes place in one and the same apparatus.

The apparatus according to the invention can be configured in stainless steel, so that corrosion arising from the meal, which in some cases is aggressive, is completely avoided.

Because the apparatus can be configured as an upright-standing vessel, an inlet can be provided in the top or in the side and an outlet in the bottom, and thus in a simple manner the meal manufacturer's processing plant is divided into an unclean and a sterile area without any great reconstruction being necessary.

With the method and the apparatus according to the invention, it is possible to carry out rapid heating so that the meal absorbs the least possible moisture during the heat treatment or the sterilization. Filling and emptying can also be effected quickly. The apparatus herewith has a relatively large capacity in comparison with the known types of apparatus and in relation to the energy consumption.

The process using the method and the apparatus according to the invention is simple to regulate. Consequently, a safe and reliable heat treatment and/or sterilization is achieved.

BRIEF DESCRIPTION OF THE DRAWINGS

The invention will now be described in more detail with reference to the drawing, which shows examples of the use of the invention in the production of bone meal, in that FIG. 1 shows a sterilization apparatus according to the invention.

DESCRIPTION OF THE PREFERRED EMBODIMENTS

The invention will now be described in more detail in connection with the production of bone meal. It will be obvious to those familiar with the art that the method and the plant will be able to be used with any form of heat treatment and/or sterilization of products in particle form, e.g. feedstuffs such as bone meal and fish meal and other kinds of feedstuffs or foodstuffs, merely providing that the products are in particle form, i.e. flowable materials.

Figure 1:
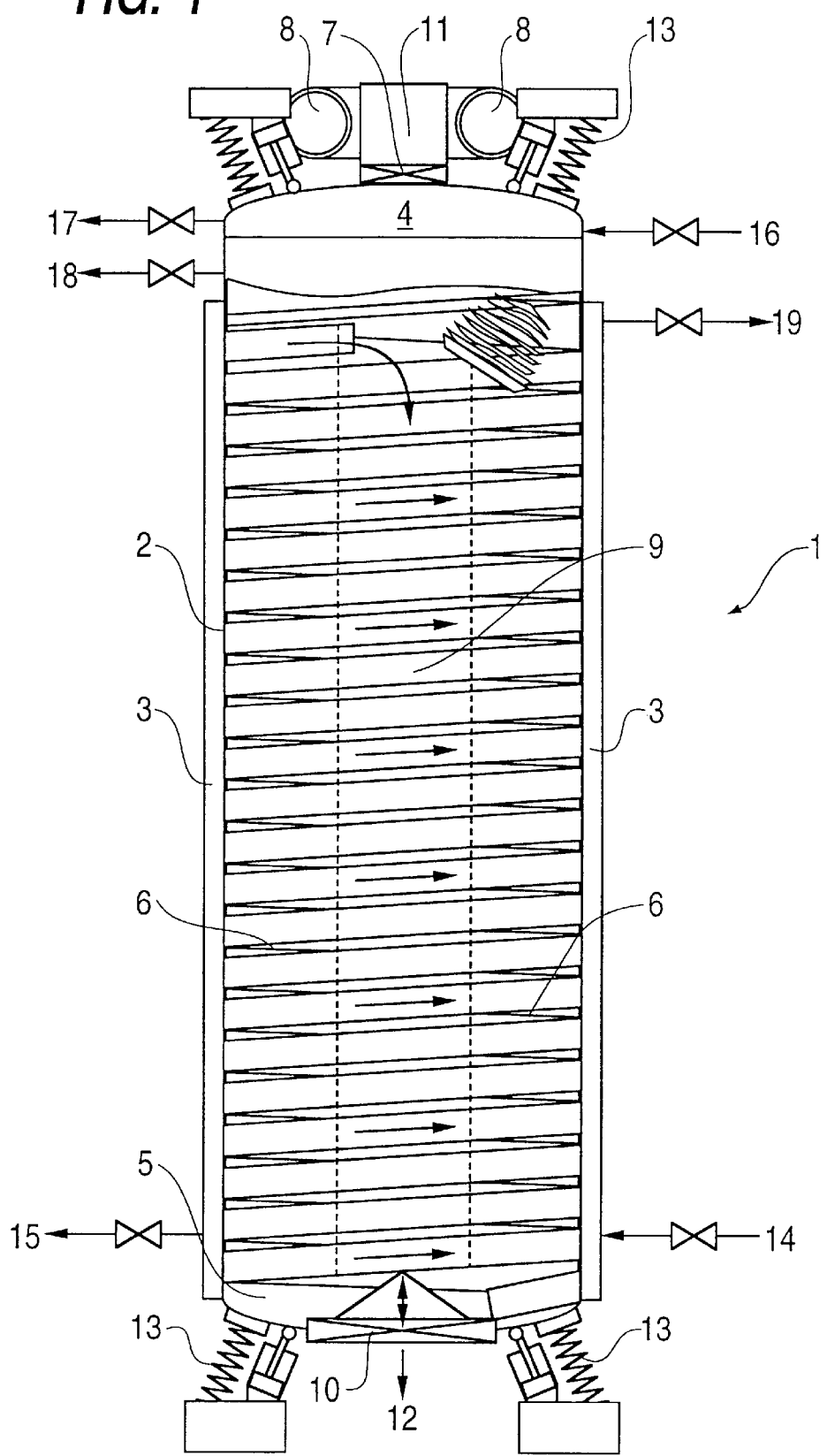

FIG. 1 shows an upright-standing apparatus 1 according to the invention comprising a pressure-tight vessel 2 with a steam-heated shroud 3 to which steam can be supplied via the pipe 14, and from where condensate can be tapped off via the pipe 15, and a pipe 19 through which the heating steam can be led away. The vessel 2 has a top area 4 and a bottom area 5. From the bottom area 5 there extends a helical vibration elevator 6 which carries the meal which is to be sterilized from the bottom area to the top area, where in a free-fall manner through the central, free area 9 it falls back to the bottom area. The central, free area 9 thus extends through the container which, in this example, also has a product inlet 11 in the top of the container for unclean meal through a shut-off valve 7. After having been processed, the sterile meal can be removed from the bottom area through the outlet valve 10 to the discharge opening 12. The outlet valve 10 which, for example, is a conical valve with the cone pointing vertically towards the inside of the vessel, functions in such a manner that when the valve is open, the sterile product is led out, and when the valve is closed the product is circulated in the elevator. The direction of circulation in the vessel 2 is shown by arrows inside the vessel. If the elevator system is a helical vibration elevator as shown in the drawing, the vibration motors 8 can be mounted outside the vessel, e.g. at the inlet 11 to the vessel. The vessel i s suspended in movable suspensions 13 in order to achieve the necessary oscillation pattern, so that the particles are conducted upwards via the spiral track 6.

There is also shown a pipe 16 for the supply of steam for direct steam heating of the vessel, a pipe 17 arranged to lead steam from the vessel to a possible flash-tank for de-flashing of the process vessel, and a pipe 18 for lowering the pressure in the vessel, e.g. by means of a vacuum pump.

As shown, all pipe connections to and from the container are provided with valves.

The apparatus is arranged to carry out the following process:
1) The apparatus is supplied with unclean meal for sterilization.
2) The inlet valve 7 is closed and air is possibly evacuated from the vessel 2 via the pipe 18, after which steam 16 under pressure is introduced directly for heating, for example steam at 2 bar overpressure (=3 bar absolute pressure). If an evacuation is effected before the steam is introduced, this is carried out for example at approx. −0.9 bar. The jacket 3 is also heated in accordance with requirements.
3) The process continues until the meal has been sterilized, which is normally a minimum of 133° C. for 20 mins.
4) The steam is de-flashed via the pipe 17 to atmospheric pressure.
5) Vacuum 18 is applied until a suitable underpressure is achieved, for example approx. −0.9 bar, so that the temperature of the now sterile meal is reduced to a temperature in the order of 75° C.
6) The vessel 2 is brought back to atmospheric pressure again.
7) The bottom valve 10 is opened and the apparatus is emptied of sterile meal.

The elevator system 6 is in operation during the whole of the process. The elevator system thus contributes both towards the filling and the emptying of the container, and to the stirring during the sterilization. The constant lifting and falling causes stirring, and according to the invention will be able to be achieved with different elevator systems, but the use of a vibration elevator is to be preferred.

The apparatus 1 constitutes a complete unit, i.e. a pressure vessel 2, inside which there is provided a vibration elevator which consists of a helical track 6 from the bottom area 5 to the top area 4. The helical track is secured to the inner wall of the vessel and does not comprise any moving parts. The through-going central opening 9 is arranged so that the product can fall freely from the end of the elevator in the top area. The elevator 6 functions in such a manner that the whole of the vessel 2 is made to vibrate by means of the vibrator motors 8. Consequently, all of the pipe connections to the container are in a known manner made flexible. During the operation of the vibration elevator, there occurs not only a stirring due to the transport of the product from the bottom area to the top area with subsequent free-fall return to the bottom area, but also a continuous stirring due to the vibrations. The result of this thorough stirring is that the heat treatment is effected in an effective manner, and that it is possible to work with a high degree of filling, e.g. in the order of 25–40%. A high degree of filling and a quick filling and emptying is achieved by allowing the elevator arrangement to be in operation during both the filling and the emptying and during the heat treatment.

Figure 2:
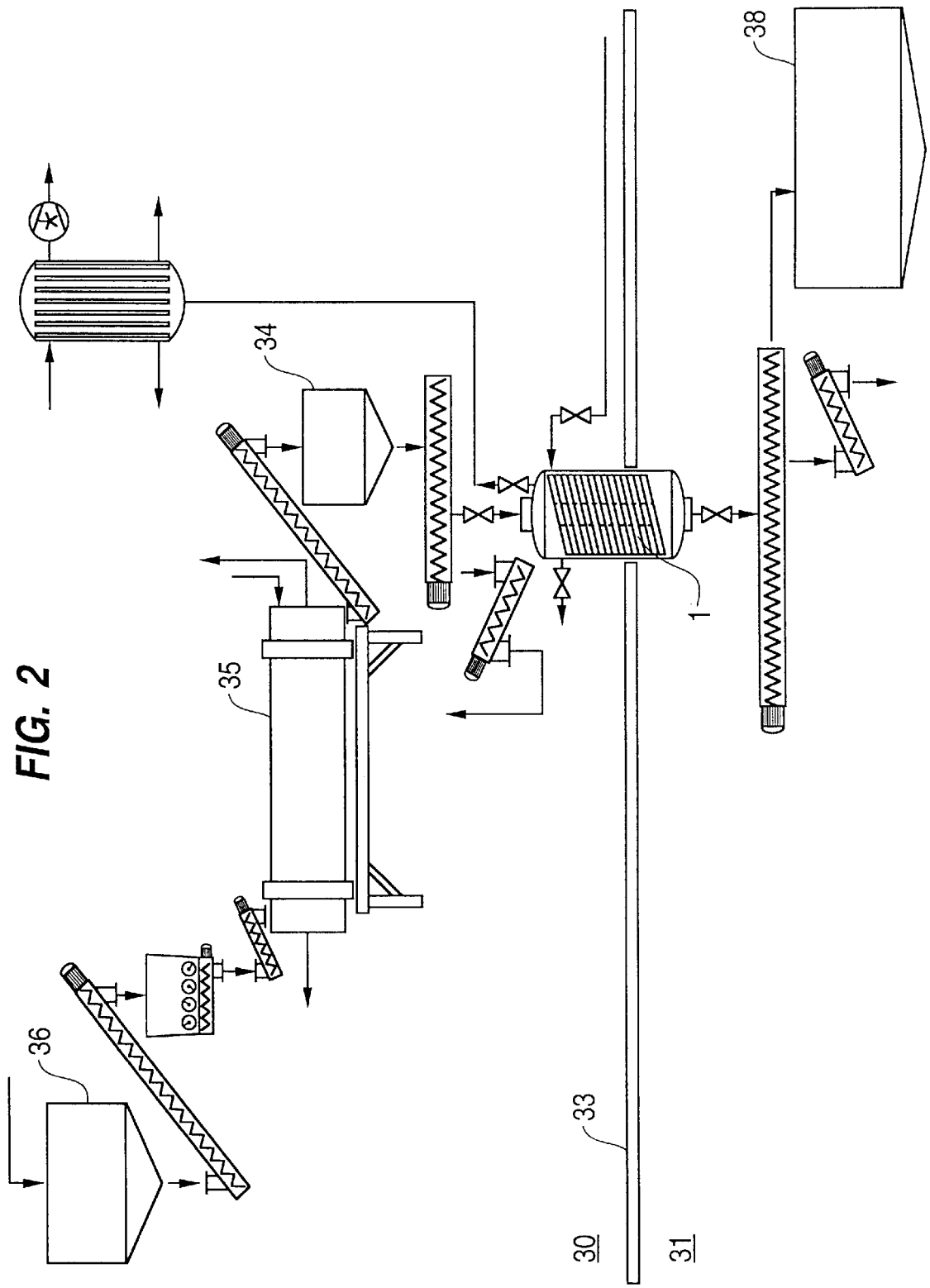
FIG. 2 shows an example of a processing plant for bone meal production with one sterilization apparatus according to the invention.

In FIG. 2 is seen a sterilization apparatus 1 arranged in a processing plant in which the line 33 shows the separation between the plant's unclean section 30 and the sterile section 31. From a store 36 of cold meal, the meal is led to a drier 35 for heating, after which the meal is fed in batches via an intermediate container 34 to the process vessel 1 according to the invention. Hereafter, the sterile meal is led to a sterile store 38 in the plant's sterile section 31. The plant shown here is for intermittent operation, in that the heated meal is stored in the intermediate container 34 and is fed to the apparatus 1 according to the invention at periodic intervals.

The product inlet 11 for unclean meal which is to be treated shall, if it is provided in the side of the container, naturally always be in the unclean section 30, so that the boundary between the unclean and the sterile sections is always well-defined.

Figure 3:
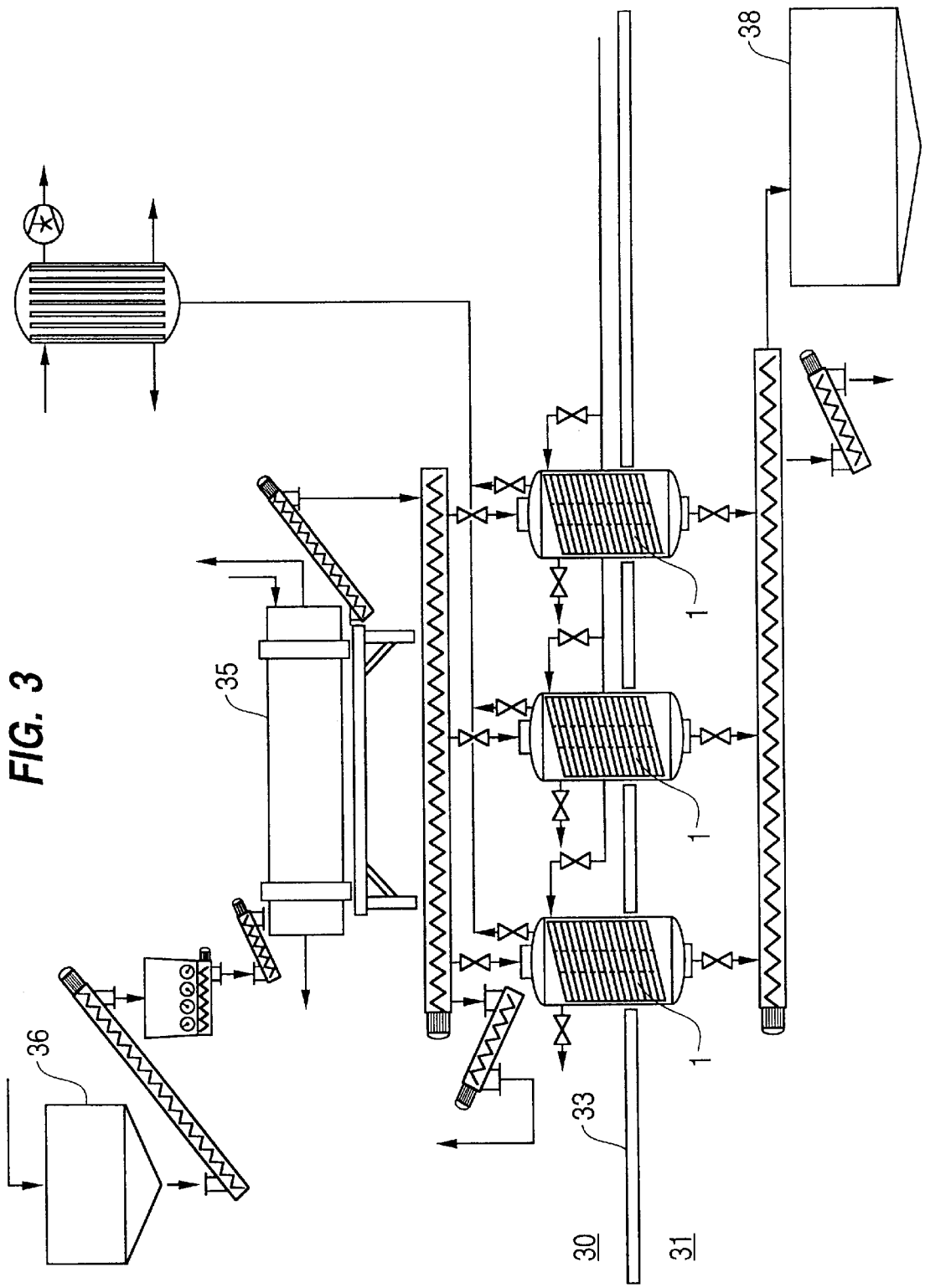
FIG. 3 shows a processing plant for bone meal production with three apparatus according to the invention for continuous sterilization.

FIG. 3 shows an example of continuous sterilization, in that three sterilization vessels 1 according to the invention are used, i.e. in such a manner that there is always one vessel being filled, one vessel being emptied and one vessel effecting sterilization.

Figure 4:
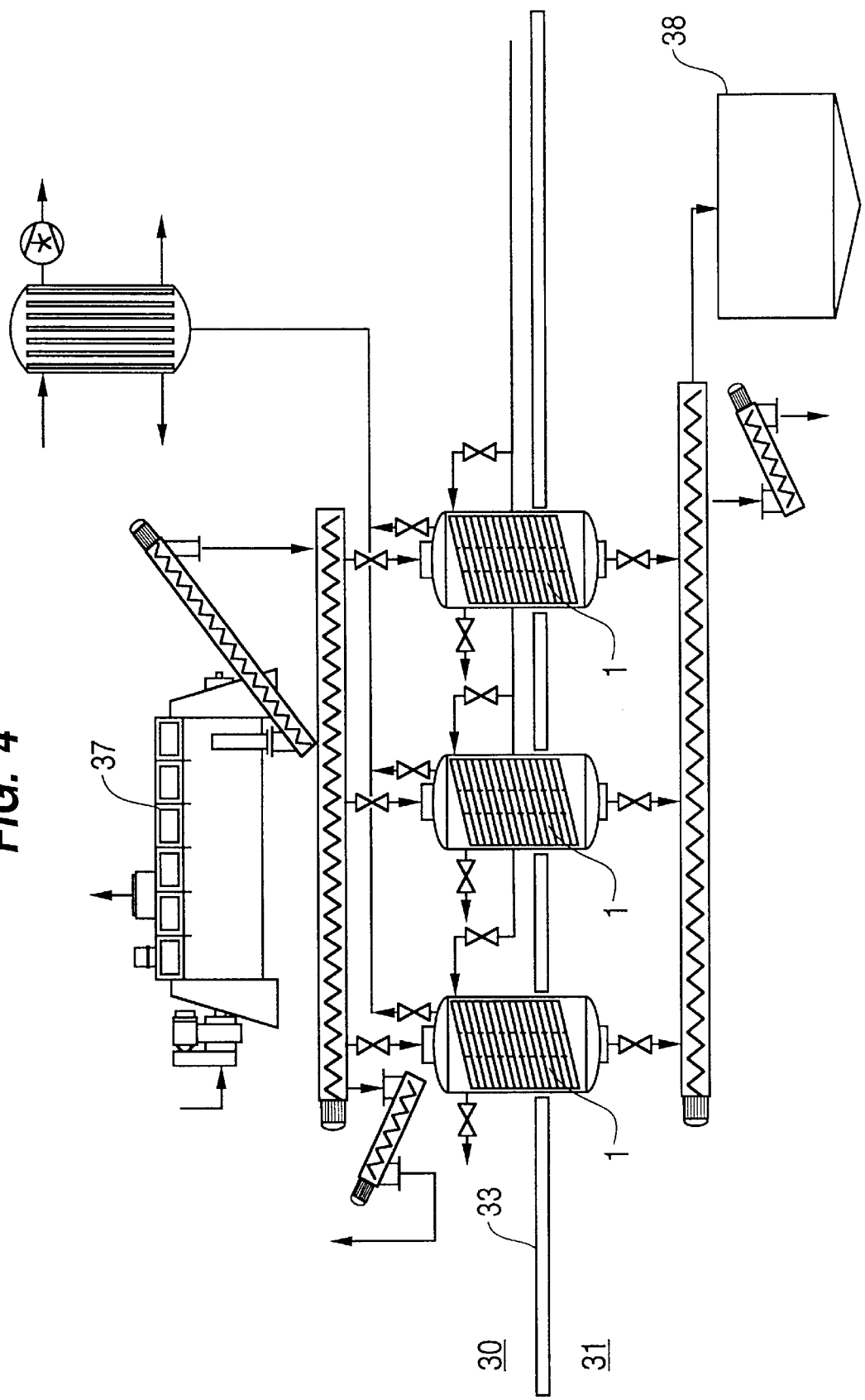
FIG. 4 shows a processing plant for bone meal production with three apparatus according to the invention for continuous production direct from the plant which produces the meal.

FIG. 4 shows a processing plant where unground, hot meal direct from the meal production, e.g. in an ATLAS Ring Channel Drier 37, is led to a sterilizing plant with three sterilization vessels 1 according to the invention in a manner corresponding to that explained in connection with FIG. 3. The whole production of the meal is hereby effected as one continuous process.

In all plant configurations it is possible by a suitable constructional arrangement to use the sterilization apparatus according to the invention as that apparatus which forms the boundary between the unclean section and the sterile section, for example so that section 30 (the unclean) and section 31 (the sterile) each constitutes its own floor. The plant can thus be divided in a simple and rational manner. With the apparatus according to the invention, in the reconstruction of older plants it is also possible in a simple manner to establish a sterile section without any great changes to the existing plant.

The apparatus according to the invention can, for example, be configured in apparatus types with the following capacity based on three sterilizers:

| | | | |
|---|---|---|---|
| Continuous Capacity (t/h) | 9.6 | 12 | 16 |
| Batch Capacity (t/h) | 3.2 | 4 | 5.3 |
| Volume Sterilizer (m³) | 12 | 16 | 26 |

I claim:
1. A processing plant for heat treatment of batches of products in particle form while stirring comprising:

a substantially upright-standing, pressure-proof vessel with an elevator arrangement lifting the batches of products in particle form from a bottom area of the vessel to a top area of the vessel, and dropping the batches of products in particle form back to the bottom area to be lifted again, the vessel being configured with a zone to be supplied with steam for heating the batches of particles of products in particle form to an elevated temperature wherein the elevator arrangement is a helical elevator with a central, through-going, free fall area for the dropping of the products in particle form to the bottom area; and the vessel has a product inlet in one of the top area or in a side thereof, and a product outlet for the batches of products in particle form in the bottom area.

2. A processing plant in accordance with claim 1 wherein:

the vessel further comprises connection couplings for pipes for connecting the steam to a shroud of the vessel for heating the products in particle form to a sterilization temperature, for steam de-flashing and for connection to a vacuum pipe.

3. A processing plant in accordance with claim 2 wherein:

the batches of products in particle form are meal.

4. A processing plant in accordance with claim 1 wherein:
the product outlet comprises a discharge valve in a form of a conical valve with an apex of a cone of the conical valve substantially vertical and pointing towards an interior of the vessel.

5. A processing plant in accordance with claim 4 wherein:
the batches of products in particle form are meal.

6. A processing plant in accordance with claim 5 wherein:
the elevated temperature is a temperature sufficient to sterilize the batches of products in particle form.

7. A processing plant in accordance with claim 4 wherein:
the elevated temperature is a temperature sufficient to sterilize the batches of products in particle form.

8. A processing plant in accordance with claim 1 wherein:
the vibration elevator operates both during the filling and the emptying of the vessel.

9. A processing plant in accordance with claim 8 wherein:
the batches of products in particle form are meal.

10. A processing plant in accordance with claim 9 wherein:
the elevated temperature is a temperature sufficient to sterilize the batches of products in particle form.

11. A processing plant in accordance with claim 8 wherein:
the elevated temperature is a temperature sufficient to sterilize the batches of products in particle form.

12. A processing plant in accordance with claim 1 wherein:
the batches of products in particle form are meal.

13. A processing plant in accordance with claim 12 wherein:
the elevated temperature is a temperature sufficient to sterilize the batches of products in particle form.

14. A processing plant in accordance with claim 1 wherein:
the elevated temperature is a temperature sufficient to sterilize the batches of products in particle form.

\* \* \* \* \*